(12) United States Patent
Moussa

(10) Patent No.: US 9,145,086 B2
(45) Date of Patent: Sep. 29, 2015

(54) MOTOR VEHICLE WITH A HEADLINER

(71) Applicant: Audi AG, Ingolstadt (DE)

(72) Inventor: Ahmed Moussa, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 150 days.

(21) Appl. No.: 13/888,956

(22) Filed: May 7, 2013

(65) Prior Publication Data

US 2013/0301286 A1    Nov. 14, 2013

(30) Foreign Application Priority Data

May 8, 2012   (DE) .......................... 10 2012 009 170

(51) Int. Cl.
*B60Q 3/02*     (2006.01)
*B60Q 3/00*     (2006.01)

(52) U.S. Cl.
CPC .............. *B60Q 3/0203* (2013.01); *B60Q 3/004* (2013.01); *B60Q 3/0279* (2013.01)

(58) Field of Classification Search
CPC ...... G02B 6/0006; G02B 6/001; B60Q 3/004; B60Q 3/0203; B60Q 3/0279; B60Q 3/0289; B60Q 3/0213; B60Q 3/025; B60Q 3/0253; B60Q 2500/10; B60R 13/02
USPC .................................. 362/479, 488, 490, 576
See application file for complete search history.

(56) References Cited

U.S. PATENT DOCUMENTS

| | | | |
|---|---|---|---|
| 2004/0062054 A1 | 4/2004 | Sturt et al. | |
| 2007/0047252 A1* | 3/2007 | Brune et al. | 362/555 |
| 2009/0073708 A1* | 3/2009 | Kino et al. | 362/490 |
| 2010/0214795 A1* | 8/2010 | Salter et al. | 362/488 |

FOREIGN PATENT DOCUMENTS

| | | |
|---|---|---|
| CN | 101093064 | 12/2007 |
| CN | 201659928 | 12/2010 |
| DE | 297 19 024 | 1/1998 |
| DE | 198 22 638 | 12/1999 |
| DE | 299 20 487 | 3/2000 |
| DE | 199 00 622 | 8/2000 |
| DE | 100 33 774 | 1/2002 |
| DE | 101 29 953 | 1/2003 |
| DE | 202005014791 | 1/2006 |
| DE | 102004039929 | 3/2006 |
| DE | 102008046935 | 5/2009 |
| EP | 1 052 145 A2 | 11/2000 |
| EP | 1 243 470 | 9/2002 |
| EP | 2 287 042 A1 | 2/2011 |
| JP | 2008001130 A | 1/2008 |

OTHER PUBLICATIONS

Chinese Search Report with respect to counterpart Chinese patent application 201310166115.3, May 8, 2013.
Translation of Chinese Search Report with respect to counterpart Chinese patent application 201310166115.3, May 8, 2013.
European Search Report issued in counterpart European patent application EP 13 00 2116 on Jul. 6, 2015.
Translation of European Search Report issued in counterpart European patent application EP 13 00 2116 on Jul. 6, 2015.

* cited by examiner

*Primary Examiner* — Y M Lee
(74) *Attorney, Agent, or Firm* — Henry M. Feiereisen LLC

(57) ABSTRACT

A motor vehicle with a headliner and one or more lighting devices extending on or adjacent to the headliner over at least a portion of the length or width of the headliner. The lighting device emits its light such that at least the headliner area can at least be partially illuminated.

17 Claims, 4 Drawing Sheets

MOTOR VEHICLE WITH A HEADLINER

CROSS-REFERENCES TO RELATED APPLICATIONS

This application claims the priority of German Patent Application, Serial No. 10 2012 009 170.2, filed May 8, 2012, pursuant to 35 U.S.C. 119(a)-(d), the content of which is incorporated herein by reference in its entirety as if fully set forth herein.

BACKGROUND OF THE INVENTION

The present invention relates to a motor vehicle with a headliner.

The following discussion of related art is provided to assist the reader in understanding the advantages of the invention, and is not to be construed as an admission that this related art is prior art to this invention.

At least one light fixture is usually installed in the headliner of a motor vehicle, which in most cases serves to illuminate the interior space, i.e. radiates into the vehicle interior. Sometimes a complete lamp module is installed, which in addition to a space light has also two reading lights providing a substantially spot-shaped illumination. This type of lighting is used for room lighting, either over a large area for the actual room illumination, or limited as a reading light. These lights are switched on only when needed. The room light is usually switched on automatically when a vehicle door is opened or specifically, when light is needed in the vehicle interior, whereas the reading lights is switched on only when, for example, the driver or passenger wants to read a map and the like.

Furthermore, lighting devices are sometimes installed in modern motor vehicles, which are used to generate an ambiance lighting, i.e. to emit only a certain background light in specific areas of the vehicle which has a pleasant feel and gives a positive space sensation. These lighting devices are installed, for example, in the area of the foot well of the driver and front passenger and also the rear row of seats, allowing these foot wells to be easily illuminated. Although it is possible to illuminate the floor area, this illumination is rarely noticed by the occupants of the vehicle.

It would therefore be desirable and advantageous to obviate prior art shortcomings and to provide an improved motor vehicle which enables the generation of a perceptible ambiance light.

SUMMARY OF THE INVENTION

According to one aspect of the present invention, a. motor vehicle includes a headliner, and at least one lighting device arranged on or adjacent to the headliner and extending over at least part of a length or a width of the headliner and emitting light so as to illuminate at least a partial area of the headliner.

In the vehicle according to the invention, a lighting device which is arranged so as to emit light directly and exclusively to the headliner facing the interior space of the vehicle is integrated in the headliner. The headliner thus operates as a radiation or projection surface and is illuminated directly. The lighting device emits light only in the direction of the headliner, but not directly into the vehicle interior.

The lighting device is an elongated lighting device which extends over part of the length of the headliner, i.e. it extends in the direction of the vehicle's longitudinal axis, or it extends over part of the width of headliner, i.e. transversely to the vehicle's longitudinal direction. The elongated lighting device emits the light over its entire length, so that a large area of the headliner may be illuminated.

The headliner thus "lights up" over a large area when illuminated, with the difference in brightness due to the lighting compared to the non-illuminated area of the headliner being visually perceptible and thus also perceived by the occupants of the vehicle. Of course, the illuminated headliner also faintly illuminates the vehicle interior, i.e. forms itself a light radiation surface which spreads the ambiance light over a large area of the interior space. Since the headliner has a very large area, a large ambient area can consequently be produced using such a lighting device, which not only has a more or less limited illuminated volume, as with the foot well illumination, but also covers a large area and immerses a large area of the passenger compartment in a pleasant ambiance light.

In principle, only one light device may be used which runs, for example, in the center of the headliner in the longitudinal direction of the vehicle or transversely to the longitudinal direction and illuminates both sides of the headliner. According to an advantageous feature of the present invention, two lighting devices may be provided, which extend in the longitudinal direction of the vehicle and are arranged on the two opposite sides of the headliner; alternatively, two lighting devices which extend in the transverse direction of the vehicle and are arranged on the two opposite sides of the headliner may be integrated. Consequently, the two lighting devices illuminate the headliner from two opposite sides, thereby producing a largely uniform headliner illumination, or at least a symmetric headliner illumination.

As stated above, the lighting device is elongated and is thus able to emit light over almost its entire length. According to another advantageous feature of the present invention, the lighting device is an optical light guide which emits light laterally. In other words, each lighting device has an elongated light guide, which has for example a length of half a meter or one meter or more, and which emits light laterally over its entire length, which can be achieved by suitably patterning the outer surface of the light guide. I.e., the light coupled into the end face of the optical light guide is laterally coupled out of the light guide along the length of the light guide, wherein the light guide is arranged so that this light is emitted directly onto the headliner. In this way, on one hand, light emission over a considerable distance can be implemented in a very simple manner and, on the other hand, because such light guide is relatively narrow, it can be easily integrated on the side of the vehicle and the headliner, respectively. Alternatively, instead of a light guide, a light strip with a plurality of individual small light sources, in particular individual LEDs may be used.

According to another advantageous feature of the present invention, in order to more easily integrate the lighting device, in particular the light guide, an elongated mounting strip may be located on the backside of the headliner, with at least one support on which the lighting device, in particular the light guide is supported, being attached to the mounting strip. This mounting strip, which is preferably glued to the back of headliner, forms in a simple manner an invisible attachment for a corresponding support to which the lighting device is then attached. The mounting strip furthermore ensures that light is not emitted behind the headliner, and that instead virtually all the light emitted from the lighting device, particularly from the light guide, is actually emitted toward the headliner.

According to another advantageous feature of the present invention, the support used to attach and secure the lighting device, respectively, may be constructed as a retaining strip, which engages in the mounting strip from the front side of the headliner. The lighting device, in particular the light guide, may be inserted in and/or affixed to this retaining strip. I.e., the mounting arrangement has thus two simple strip-shaped components, of which one is attached on the backside of headliner, while the other is attached from the front. These two strips are preferably constructed as simple plastic components so that they are, on the one hand, very light-weight and can, on the other hand, be easily produced.

Corresponding latching portions may preferably provided on the strips for connecting the mounting strip with the retaining strip, i.e. the two strips interlock with one another and receive the headliner between them.

According to another advantageous feature of the present invention, the mounting strip may be attached, preferably glued, on the backside of the headliner, whereas the retaining strip with the lighting device may be applied from the front of the headliner, preferably interlocking with the mounting strip. The two strips may hereby be arranged at the edge of the headliner and receive the edge of the headliner between them. However, since the lighting device should not actually be attached near the edge, but preferably in a region where the headliner transitions into a more or less horizontal center part, and not least because of the usually more complex geometry of the headliner in the edge region, a longitudinal slot may advantageously be provided in the headliner through which the retaining strip protrudes. This slot may be provided at any position in the headliner. The mounting strip is located on the backside of the headliner and extends over the slot, whereas the retaining strip is inserted with its attachment or locking portion from the front of the headliner through the slot and interlocked with the mounting strip. The slot is of course fully covered in the installed position and is therefore not visible from the inside. Only the retaining strip is visible and accordingly provided with an appropriate attractive visual appearance. This can be readily achieved by constructing the retaining strip as a plastic strip, since the outer side of this plastic strip can be easily suitably structured or coated with a visually attractive laminate layer or metalized and the like.

According to another advantageous feature of the present invention, the lighting device may be disposed so as to be hidden behind a shield. I.e., shielding means which allow emitted light to pass to the headliner only through a narrow gap and prevent direct illumination of the passenger compartment may be associated with the lighting device. The shielding means ensure that the vehicle occupants cannot see the lighting device, for example, the longitudinal light guide. The occupants can then only see the shield, which may advantageously be realized by the retaining strip itself and, as described above, can then be designed with a pleasant visual appeal. To this end, the retaining strip includes a web which extends over the lighting device, in particular the light guide, and forms the shield, behind which the lighting device, in particular the light guide, is arranged. This web is routed so that is completely covers, on one hand, for example the light guide, while on the other hand a gap remains across this web, whose width and aperture angle, respectively, is constructed so that the light from the rear lighting device is emitted specifically through this gap and exclusively to the headliner.

The headliner advantageously includes a covering for use as an illumination surface and extending in front of a solid headliner component. This covering may have a certain color, for example, silver or beige, i.e. a bright color, against which other colors of the light that the lighting device may project thereon are noticeable with high color fidelity. In principle, light of different colors can be radiated by the illumination device onto the headliner, wherein preferably a plurality of differently colored and separately controllable light sources emit light that can be coupled into the lighting device, in particular the light guide. This enables the driver or passenger to select, as desired, a particular ambiance light color, for example via a suitable menu selection which can be called up on an integrated onboard display and selected via a suitable control element, such as a rotary pushbutton. In other words, the occupants of the vehicle can decide themselves whether they prefer, for example, a red, yellow, green or blue ambiance lighting. This light color is reproduced with a neutral color via the headliner, preferably after a bright color of the covering has been selected (or, if such a covering is not provided, a bright headliner color). The headliner itself or the covering may also have slightly reflective properties in order to improve the light emission into vehicle compartment.

When such a covering is provided, this covering may be affixed to the retaining strip itself, so that the retaining strip is used not only as a support for the lighting device, but also as a support for the covering.

According to another advantageous feature of the present invention, the brightness of the lighting device may be varied. The brightness may also be easily adjusted as desired, for example, via a corresponding menu selection on a vehicle display, thus allowing the intensity and brightness of the ambiance light to be adjusted as desired. This is of course independent on whether only a single light source emitting only a specific color is provided or whether a plurality of separately controllable light sources emitting different colors are provided. For this purpose, a suitable control device for operating and/or controlling the light source may be used.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
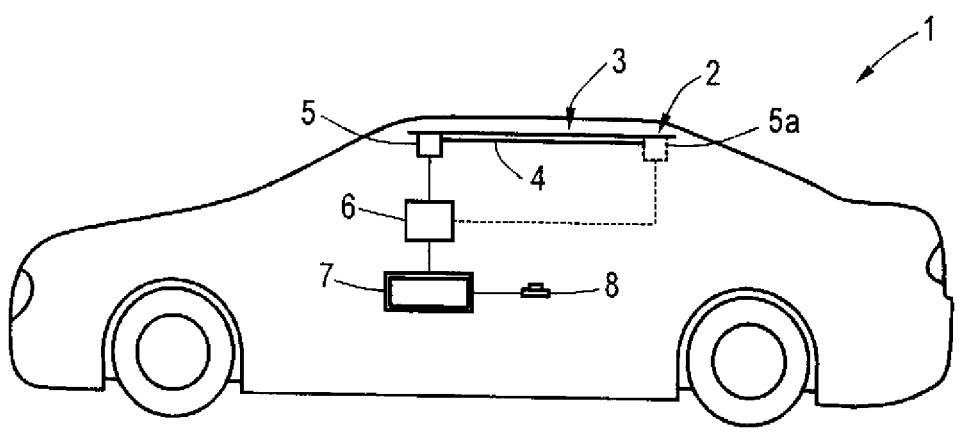
FIG. 1 a schematic diagram of a motor vehicle according to the present invention, FIG. 2 a diagram of the headliner with an illumination device in an exploded view, FIG. 3 a sectional view through a headliner with installed lighting device, FIG. 4 a schematic diagram in the form of a sectional view of the headliner with installed lighting device, in a partial view, and FIG. 5 a sectional view corresponding to FIG. 4 in the region of an interlocking connection between the retaining strip and the mounting strip.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 1 according to the present invention with a headliner 2 and a lighting device 3 extending in the longitudinal direction of the vehicle and including a light guide 4 which is hidden in the assembled position, and in the illustrated example at least one light source 5, preferably a LED, which emits light that is coupled into the optical light guide, which couples the light out laterally along its length and thereby illuminates the headliner 2, as will be discussed hereinafter.

Furthermore, a control device 6 controlling the operation of the light source 5 is associated with the lighting device 3. The control device 6 is in turn controlled on the operator side via a display 7 and an associated input or control device 8, for example, a rotary push-button so as to, on one hand, switch the illumination device 3, which forms an ambience light, on and off and vary the brightness, or—when the light source 5 includes a plurality of separate light sources emitting differently colored lighting, such as individual LEDs—adjust the corresponding desired light color.

FIG. 1 also shows in form of a dashed line an exemplary second light source 5a, which may be provided on the other side of the optical light guide, and which is also controlled by the control device 6. Light can then be coupled into the optical light guide from both sides to ensure that the light is emitted uniformly over its entire length.

Figure 2:
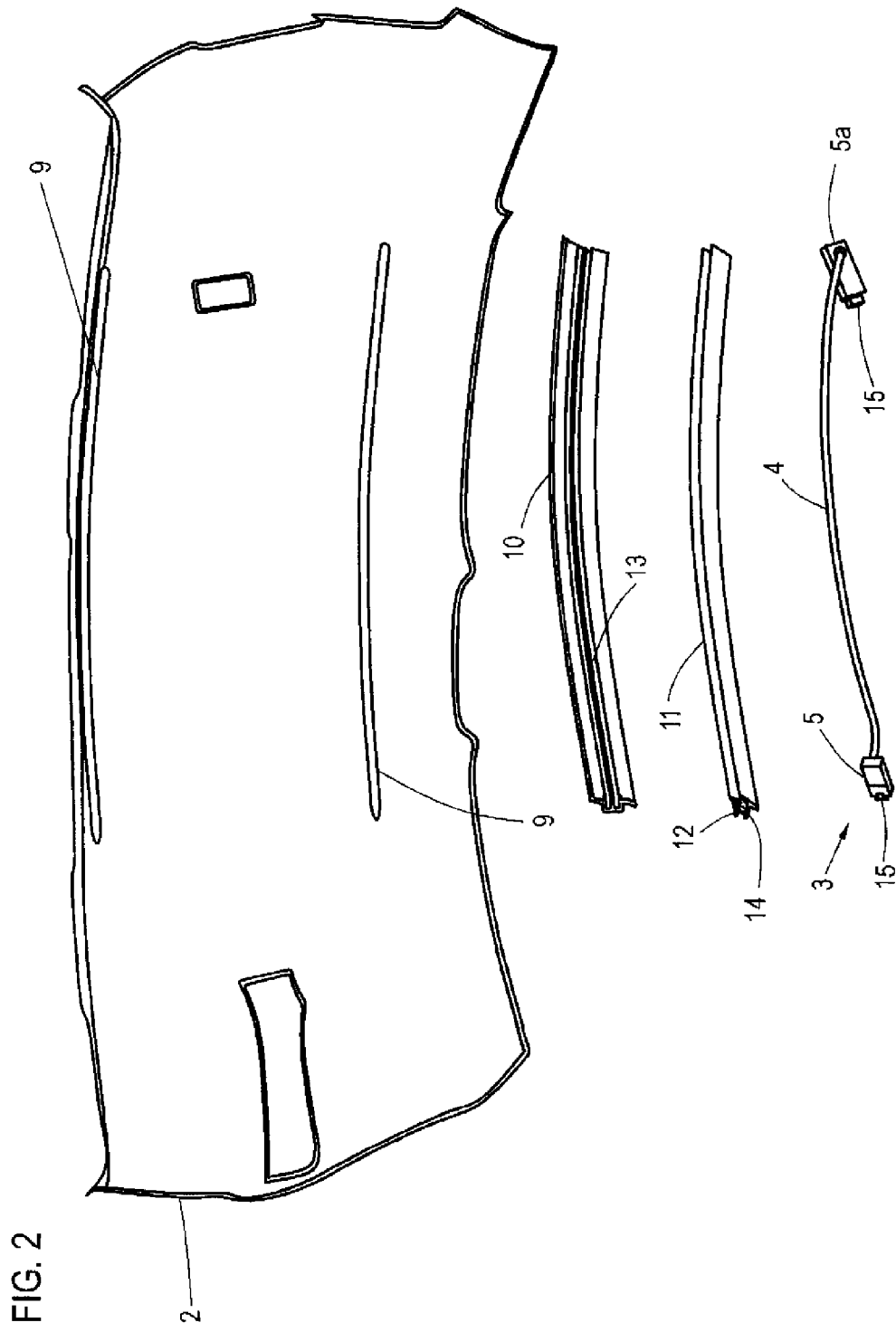

FIG. 2 shows in an exploded view the essential components of the headliner 2 in addition to the lighting device 3. The headliner 2, usually a plastic molded part, has two slots 9 in the region of its two longitudinal edges. These slots 9 are used to affix the lighting device 3. For this purpose, a mounting assembly includes a mounting strip 10, which is disposed, preferably glued, on the backside of the headliner 2. The mounting assembly further includes a retaining strip 11 which is attached from the front side of the headliner 2 and engages with rear engaging ribs 12 in a corresponding engagement groove 13 of the mounting strip 10. The retaining strip 11 is secured in place via detent hooks disposed on one of these engaging ribs 12, which snap in the assembled position in corresponding latching receptacles disposed on the mounting strip 10, as described hereinafter.

Also shown is the light guide 4, which is affixed via the retaining strip 11. To this end, the retaining strip 11 has a retaining groove 14 into which the light guide 4 is inserted and secured in place. The two exemplary light sources 5, 5a which can be coupled to the control device 6 via corresponding connections 15 are shown here at the two ends of the light guide.

Figure 3:
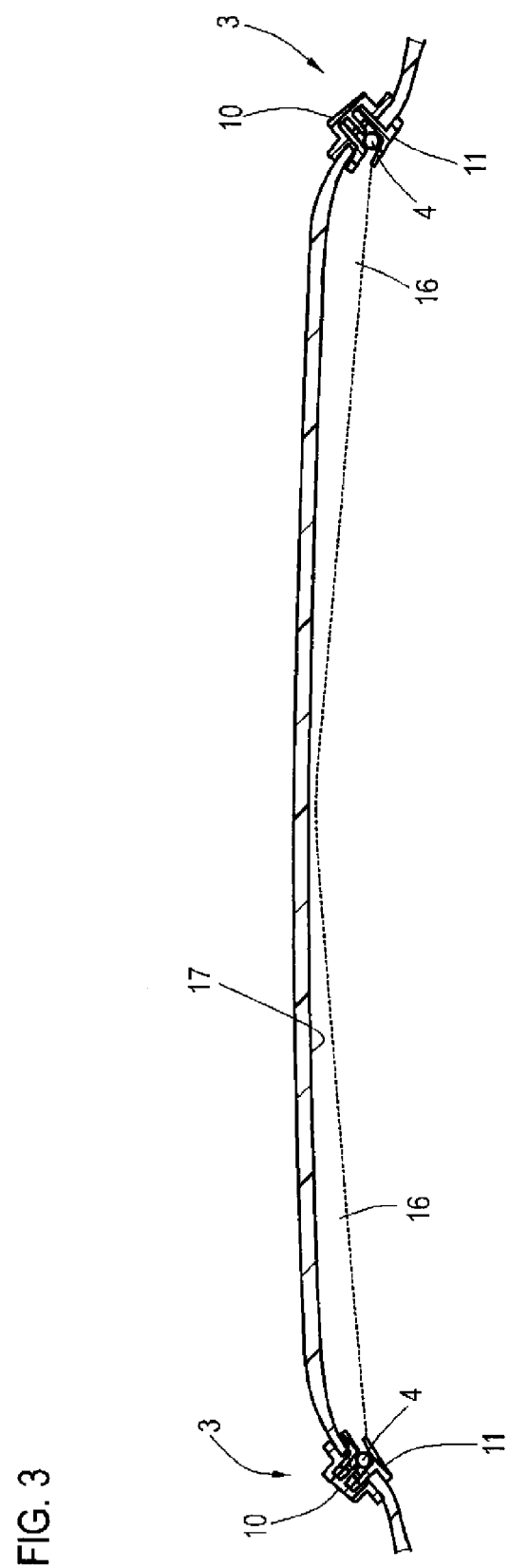

As described above, two slots 9 are provided in the headliner 2, with a lighting device 3 and a mounting arrangement associated with each slot 9. FIG. 3 shows a sectional view through a headliner 2 with installed lighting devices 3. Obviously, the two lighting devices 3 are located in the region of the longitudinal edges of the headliner 2. Shown in each case are the mounting strip 10, the retaining strip 11 and the light guide 4. The illuminated area 16 illuminated by the light guide 4 is shown with dashed lines. As can be seen, the two light guides 4 are arranged in the respective retaining strip 11, which is in turn affixed in the fixing strip 10, so that the light emitted laterally from the light guide 4 is radiated only to the interior surface 17 of the headliner, but not directly into the interior the passenger compartment. In other words, the interior surface 17 of the headliner 2 hence represents an illumination or projection surface onto which the light from the light guide 4 is exclusively radiated. The retaining strips 11 are constructed so that the formed light exit slot opens so as to illuminate the entire headliner surface, as seen along its width, as the result of the two cooperating light guides 4, as illustrated in FIG. 3. It can be seen that the illuminated sections virtually overlap in the center of the headliner, so that the entire headliner is illuminated, with the brightness slightly decreasing from an outer edge towards the center of the headliner. Both lighting devices 3 are of course operated simultaneously.

Figure 4:
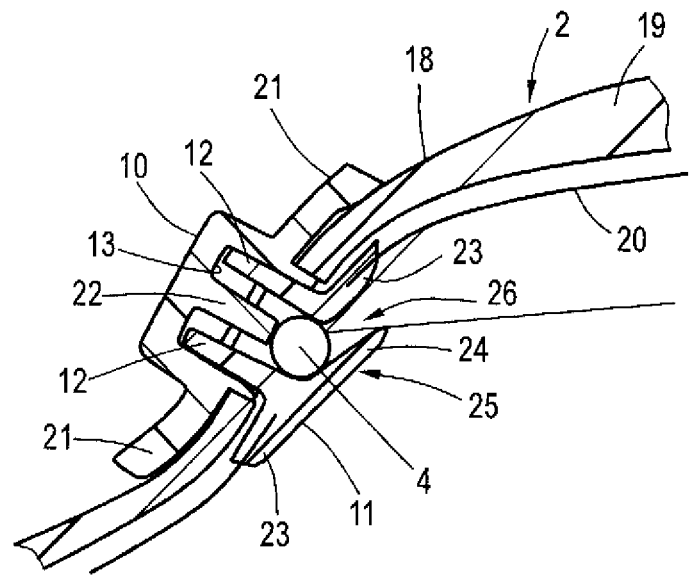

FIG. 4 shows in an enlarged schematic diagram a sectional view of the lighting device 3, together with mounting arrangement of FIG. 3, which is located on the left side of the headliner. Shown is the mounting strip 10 which is attached on the backside 18 of the headliner 2. The headliner 2 is composed of a stable headliner component 19, with the mounting strip 10 bonded on the backside 18, and a covering 20 which covers and/or disguises the headliner component 19 on the inside and which forms the projection or illumination area of the headliner 2. This covering is made, for example, of fabric and may optionally have a partially reflective coating or finish. The covering 20 has preferably a bright color, i.e. white, silver, cream, so that the illuminating colored light that is particularly well suited for forming an ambience light, is reproduced with a neutral color.

The mounting strip 10 has two lateral mounting portions 21 configured for adhesive attachment to the backside of the headliner. A groove 13 with a projecting rib 22 is provided between these mounting portions 21. For example, several of such ribs are spaced from each other along the length of the mounting strip, which then pass through corresponding openings in the retainer strip.

Also shown is the retaining strip 11, which likewise has two lateral portions 23 on which in the illustrated example the covering 20 is affixed, for example glued or attached to a corresponding groove. The two portions 23 overlap the headliner component 18 in the region of the longitudinal slot 9. The two engaging ribs 12 of the retaining strip 11 pass through the longitudinal slot 9 and abut the longitudinal edges of the groove 13. Each of the respective ribs 22 extends between the engaging ribs 12 and passes through a corresponding opening in the retainer strip. The openings are formed commensurate with the distribution of the ribs 22 along the retaining strip 11.

Also shown is the light guide 4 which is secured in the mounting strip 11. In the assembled position, the strip 22 presses against the light guide 4 and then presses the light guide 4 against another web 24 of the retaining strip 11. This web 24 forms a shield 25 behind which the light guide 4 is hidden, which is therefore invisible to the vehicle occupants. The web 24 further serves to realize a light emission gap or a slot 26 which is formed between the web 24 and the portion 23. These two elements and the gap 26, respectively, delimit the light emission path via which the light that is laterally emitted from the light guide 4 can be emitted from the retaining strip 11, namely in the direction of the headliner 2 and the covering 20, respectively. Due to the web 24, the emitted light is emitted only upward in the direction of the headliner and the covering 2, respectively, but not into the interior of the passenger compartment. This enables the flat illumination shown in FIG. 3.

Figure 5:
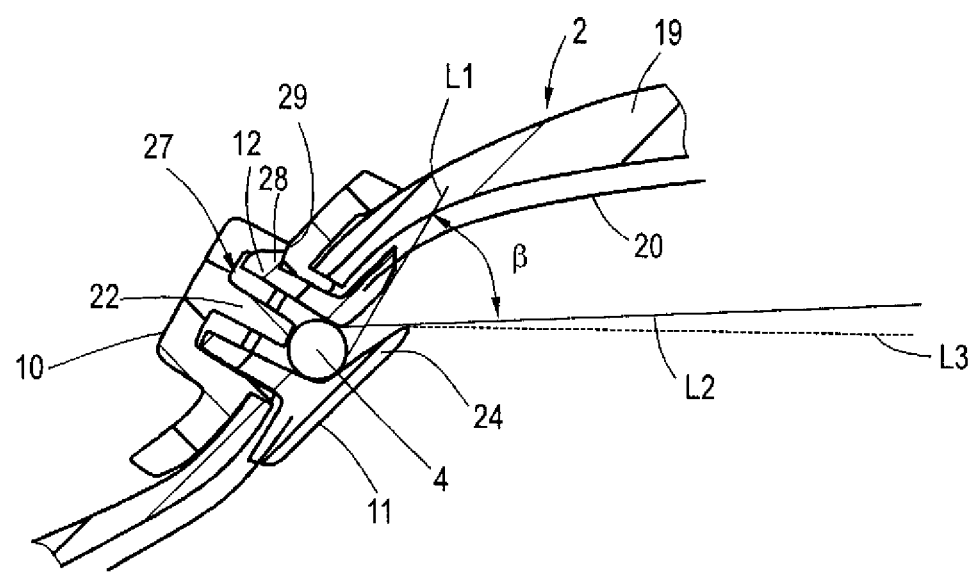

FIG. 5 lastly shows the attachment of the retaining strip 11 to the mounting strip 10. The mounting strip 10 has a plurality of openings 27 distributed over its length, with which correspondingly arranged detent lugs 28 which are formed on an engaging rib 12 of the retaining strip 11 engage. The detent lugs 28 lock behind corresponding locking portions 29 of the mounting strip 10, which facilitates installation of the retaining strip. During assembly, the light guide 4 is inserted first in the retaining strip 11, whereafter the retaining strip 11 is inserted through the slot 9 into the already adhesively attached mounting strip 10 and the groove 13, respectively, where it interlocks. During this insertion motion, the light guide 4 is moved against the rib 22, which presses the light guide 4 against the respective web 24 in the assembled position, i.e. after interlocking, as described above. The light guide is then secured in place and/or clamped via the web 24 and the two engaging ribs 12, respectively, in conjunction with the ribs 22.

FIG. 5 shows in addition two lines L1 and L2 which represent the virtual boundary lines delimiting the illuminated volume and light exit region, respectively. The lines L1, L2 are defined by the geometry and arrangement of the portion 23 and its outer contour, respectively, and the web 24 and its contour, respectively, forming an illumination angle β between them, which is designed so as to illuminate slightly more than half the width of the headliner (see FIG. 3).

Furthermore, the dashed horizontal line L3 illustrates how the web 24 shields the light guide 4, because the light guide 4 is up to this level completely hidden behind the web 24, i.e. the shield 25. The viewer sees the light guide 4 only when he looks into the gap 26 from above this line L3. However, this is prevented by the shape of the headliner 2 and the arrangement of the lighting devices 3.

While the exemplary embodiment describes two lighting devices 3 arranged along the longitudinal sides of the headliner 2, with the light guides 4 extending in the longitudinal direction of the vehicle, two lighting devices may also be arranged in the front and rear headliner area, in which case they extend transversely to the longitudinal direction of the vehicle. The headliner 2 would then be illuminated along its length. The principle of operation would be identical, as well as the attachment of the lighting devices, etc.

As shown in particular in FIG. 3, by integrating the lighting devices 3 according to the invention, the headliner 2 can be directly and exclusively illuminated over a large area, therefore distributing a pleasant ambience light in the interior of the vehicle by way of the headliner 2. The color of the ambiance light can be adjusted through suitable selection of the respective color LED, when the respective lighting devices 5, 5*a* include several LEDs emitting different colors. It will be understood that the particular brightness of the LED can also be adjusted in this manner as desired.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising
    a headliner,
    at least one lighting device arranged on or adjacent to the headliner and extending over at least part of a length or a width of the headliner and emitting light so as to illuminate at least a partial area of the headliner, and
    an elongated mounting strip arranged on a backside of the headliner and having at least one retaining strip supporting the lighting device,
    wherein the at least one retaining strip engages from a front side of the headliner in the mounting strip, with the lighting device being inserted in the retaining strip, and
    wherein the retaining strip and the mounting strip are interlocked and receive the headliner between each other.

2. The motor vehicle of claim 1, comprising
    two lighting devices arranged in a longitudinal direction of the vehicle or in a transverse direction of the vehicle on two opposing sides of the headliner.

3. The motor vehicle of claim 2, wherein each of the lighting devices comprises a light guide configured to radiate light laterally.

4. The motor vehicle of claim 1, wherein the lighting device comprises a light guide.

5. The motor vehicle of claim 1, further comprising a shield wherein the lighting device is hidden from view behind the shield.

6. The motor vehicle of claim 1, wherein the headliner comprises a covering serving as an illumination surface and extending in front of a stable headliner component.

7. The motor vehicle of claim 6, wherein the covering is arranged on a laterally extending retaining strip.

8. The motor vehicle of claim 1, wherein the lighting device is configured to illuminate the headliner with differently colored light.

9. The motor vehicle of claim 8, comprising a plurality of separately controllable light sources emitting differently colored light and configured to couple the differently colored light into the lighting device.

10. The motor vehicle of claim 1, wherein the lighting device has a variable brightness.

11. A motor vehicle, comprising,
    a headliner having a longitudinal slot,
    an elongated mounting strip arranged on a backside of the headliner having at least one retaining strip and passing through the longitudinal slot and engaging from a front side of the headliner in the mounting strip and supporting at least one lighting device, with the at least one lighting device being inserted in the at least one retaining strip and extending over at least part of a length or a width of the headliner,
    a web of the retaining strip forming a shield which extends over the lighting device, with the lighting device being arranged behind the web and emitting light so as to illuminate at least a partial area of the headliner.

12. The motor vehicle of claim 11, comprising
    two lighting devices arranged in a longitudinal direction of the vehicle or in a transverse direction of the vehicle on two opposing sides of the headliner.

13. The motor vehicle of claim 12, wherein each of the lighting devices comprises a light guide configured to radiate light laterally.

14. The motor vehicle of claim 11, wherein the lighting device comprises a light guide.

15. The motor vehicle of claim 11, wherein the lighting device is configured to illuminate the headliner with differently colored light.

16. The motor vehicle of claim 15, comprising a plurality of separately controllable light sources emitting differently colored light and configured to couple the differently colored light into the lighting device.

17. The motor vehicle of claim 11, wherein the lighting device has a variable brightness.

\* \* \* \* \*